Figure 1:
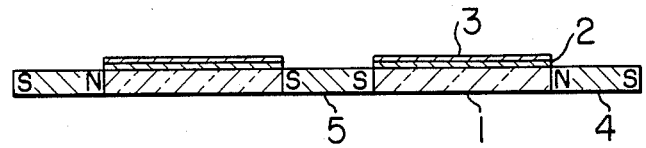

United States Patent [19]

Uesaka et al.

[11] Patent Number: 4,621,030

[45] Date of Patent: Nov. 4, 1986

[54] PERPENDICULAR MAGNETIC RECORDING MEDIUM AND MANUFACTURING METHOD THEREOF

[75] Inventors: Yasutaro Uesaka, Kokubunji; Hideo Fujiwara, Tokorozawa; Sadao Hishiyama, Sayama; Kazuo Shiiki, Kanagawa, all of Japan

[73] Assignees: Hitachi, Ltd., Tokyo; Hitachi Maxell, Ltd., Osaka, both of Japan

[21] Appl. No.: 513,422

[22] Filed: Jul. 13, 1983

[30] Foreign Application Priority Data

Jul. 19, 1982 [JP] Japan .................................. 57-124346
Sep. 13, 1982 [JP] Japan .................................. 57-158096

[51] Int. Cl.⁴ .............................................. B21C 37/00
[52] U.S. Cl. ...................................... 428/607; 428/611;
428/621; 428/678; 428/679; 428/680; 428/681;
428/928; 360/134; 360/135
[58] Field of Search ............... 428/607, 611, 621, 678,
428/679, 680, 681, 928; 360/134, 135

[56] References Cited

U.S. PATENT DOCUMENTS

| | | | |
|---|---|---|---|
| 3,582,912 | 6/1971 | Valin et al. ........................ | 148/31.55 |
| 4,103,315 | 7/1978 | Hempstead et al. ................ | 428/928 |
| 4,224,381 | 9/1980 | Patel et al. .......................... | 428/928 |

FOREIGN PATENT DOCUMENTS 355651 12/1972 U.S.S.R. .............................. 360/134

Primary Examiner—John P. Sheehan
Attorney, Agent, or Firm—Antonelli, Terry & Wands

[57] ABSTRACT

A perpendicular magnetic recording medium free from spike noise having a high permeability magnetic material film, an antiferromagnetic material film and a perpendicularly oriented magnetic material film formed on a substrate in this order. Another high permeability magnetic material film may be formed between the antiferromagnetic material film and the perpendicularly oriented magnetic material film. During the formation of the antiferromagnetic material film, a magnetic field is applied in a direction of a track width.

33 Claims, 9 Drawing Figures

PERPENDICULAR MAGNETIC RECORDING MEDIUM AND MANUFACTURING METHOD THEREOF

The present invention relates to a magnetic recording medium used in a perpendicular magnetic recording system.

In the perpendicular magnetic recording system, a magnetic recording medium such as a magnetic tape or a magnetic disc having a magnetic material layer for magnetic recording (perpendicularly oriented magnetic film) having an easy axis of magnetization perpendicular to a direction of transport of the magnetic recording medium, that is, in a direction of thickness of the magnetic recording medium is used and a perpendicular magnetic recording head for creating a strong magnetization distribution along the thickness of the magnetic recording medium is used to magnetize the magnetic recording medium thicknesswise to orient the magnetization thicknesswise in the magnetic material layer. When the perpendicular component of residual magnetization is present, a demagnetization field is low and a high density recording with a low loss is attained. (See, for example, Japanese Patent Application Laid-Open No. 52-134706.)

It is known that a perpendicular magnetic recording medium comprising, as an upper layer, a magnetic material layer having an easy axis of magnetization perpendicularly to a surface of the medium and, as a lower layer, a single layer of high permeability magnetic material exhibits a high performance when used for the perpendicular magnetic recording system. (See, for example, Japanese Patent Application Laid-Open No. 52-78403.)

However, when recording and reproducing operations are effected with the recording medium having the single-layer high permeability magnetic layer under the perpendicularly oriented magnetic film, big and sharp noises are observed. Such a spike noise is not observed when the recording and reproducing operations are effected with a single-layer recording medium comprising only the perpendicularly oriented magnetic film.

The following references are cited to show the state of art:
(i) U.S. Pat. No. 3,120,001
(ii) Japanese Patent Application Laid-Open No. 52-134706
(iii) Japanese Patent Application Laid-Open No. 52-78403
(iv) Japanese Patent Application Laid-Open No. 54-51804

It is an object of the present invention to provide a high performance perpendicular magnetic recording medium which exhibits a low spike noise.

It has been found by an experiment of the inventors of the present invention that the spike noise observed in a medium comprising only the high permeability magnetic material layer and no perpendicularly oriented magnetic film is substantially the same as the spike noise observed in the double-layer medium comprising the perpendicularly oriented magnetic film and the high permeability magnetic material layer, that is, the spike noise is not derived from a mutual action of the high permeability magnetic material layer and the overlying perpendicularly oriented magnetic film but from only the high permeability magnetic material layer.

The inventors of the present invention have found in view of the relationship between the spike noise interval and domain structure that the spike noise is derived from a magnetic wall.

From the above, it has been found that a best way to suppress the spike noise is to suppress the creation of the magnetic wall in the high permeability magnetic material layer.

The inventors of the present invention have discovered that the spike noise can be suppressed by utilizing a coupling phenomenon which occurs in an interface of a ferromagnetic material and an antiferromagnetic material.

That is, the creation of the magnetic wall in the high permeability magnetic material film is suppressed by applying an external magnetic field in a predetermined direction of the high permeability magnetic material film during or after the formation of the film thereby to eliminate the magnetic wall and then forming an antiferromagnetic material film on the high permeability magnetic material film while applying the external magnetic field.

When the magnetic field is not applied in the predetermined direction during the formation of the antiferromagnetic material film, the magnetic wall in the high permeability magnetic material film is not eliminated. Therefore, the application of the magnetic field during the formation of the antiferromagnetic material film is essential.

After the antiferromagnetic material film has been deposited, it is difficult to directly observe the magnetic wall of the underlying high permeability magnetic material film. Accordingly, the recording and reproducing operations to and from the resulting magnetic material film are effected by a magnetic head to check if the spike noise is generated or not so that the presence or absence of the magnetic domain is confirmed.

When the antiferromagnetic material film is not directly deposited on the high permeability magnetic material film but the sample is once taken out of a film forming bath, it is desirable to lightly etch the surface of the sample after the sample has been again loaded in the antiferromagnetic film forming bath in order to clean the surface of the sample.

The antiferromagnetic material film may be a known Fe-Mn alloy although it is not restrictive. When a content of Fe of the Fe-Mn alloy is no more than 45 atomic percent or no less than 55 atomic percent, the suppression of the creation of the magnetic wall is not perfect. Thus, when the Fe-Mn alloy is used as the antiferromagnetic material film in the present invention, it is desirable that the content of Fe of the Fe-Mn alloy is in a range of 45–55 atomic percent. Beside the Fe-Mn alloy, the antiferromagnetic material film may be other well-known antiferromagnetic materials such as $CoF_3$, $FeF_3$, $NiO$, $FeS$, $VS$, $\alpha\text{-}Fe_2O_3$ or Cr-Mn.

A thickness of the antiferromagnetic material film is preferably no less than 20 Å and no more than 2000 Å. If the film thickness is less than 20 Å, the film is formed into island pattern and it does not function satisfactorily to eliminate the spike noise. On the other hand, if the film thickness is more than 2000 Å, a recording efficiency is reduced so that a current to be supplied to the recording head must be increased and an S/N ratio is lowered.

As the perpendicularly oriented magnetic film deposited on the antiferromagnetic material film, a well-known Co-Cr alloy (content of Cr being 12–30 atomic percent) or Co-Ru alloy, which has been used in the prior art perpendicular magnetic recording medium, may be used, though they are not restrictive. When the Co-Cr alloy film or a similar alloy film is used as the perpendicularly oriented magnetic film, a magnetic recording medium of a better perpendicular orientation of magnetization is obtained by depositing an amorphous film of a $SiO_2$ film, $Al_2O_3$ film or metal film on the antiferromagnetic material film and forming the perpendicularly oriented magnetic film on the amorphous film, than by directly depositing the Co-Cr alloy film or the similar alloy film on the antiferromagnetic material film.

When the thickness of the topmost perpendicularly oriented magnetic film is too thin, a reproduced output is small, and when the thickness of the perpendicularly oriented magnetic film is too thick, the effect of the high permeability magnetic material film is weakened and the current necessary for recording increases and the S/N ratio is lowered. Thus, the thickness of the perpendicularly oriented magnetic film is preferably no less than 0.03 μm and no more than 0.5 μm, and preferably no less than 0.1 μm and no more than 0.2 μm.

However, when the Co-Cr alloy film, a film of the Co-Cr alloy having a third element added thereto or the Co-Ru alloy film is used as the perpendicularly oriented magnetic film, it has been known that, if the film thickness of the Co-Cr alloy film is less than 0.3 μm, an orientation of a c-axis of a hcp crystal perpendicular to the film surface is insufficient as compared with that of a film having the film thickness of no less than 0.3 μm and hence the resulting film exhibits a poor perpendicular orientation of magnetization. In order to improve the above disadvantage, a heat treatment in vacuum, an inert gas or a reducing gas has been known. However, if the heat treatment temperature is too low, the effect of the heat treatment is zero, and if the heat treatment temperature is too high, the perpendicular orientation of magnetization of the Co-Cr alloy film is rather deteriorated.

Figure 6:
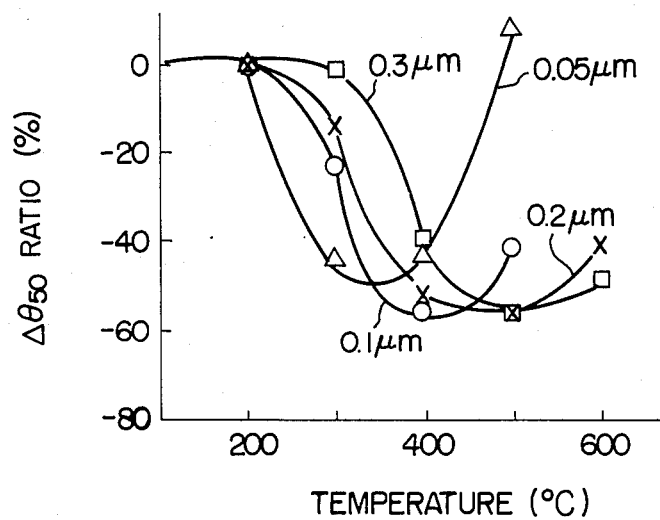

FIG. 6 shows relations between the heat treatment temperatures of the Co-Cr films of various thicknesses and the c-axis orientations of the hcp crystals of the films (represented by a variation rate of half width $\Delta\theta_{50}$ of X-ray diffraction rocking curve on a (0002) plane of the hcp crystal). In FIG. 6, the smaller $\Delta\theta_{50}$ is, the better is the perpendicular orientation of magnetization of the medium. The respective curves are accompanied by the film thicknesses.

It is seen from FIG. 6 that the heat treatment temperature adapted to obtain a maximum perpendicular orientation of magnetization of the Co-Cr film varies depending on the thickness of the film and the optimum heat treatment temperature is 350° C.–550° C. when the thickness of the Co-Cr film is in a range of 0.03 μm– 0.3 μm, and it is 400° C.–500° C. when the film thickness is 0.1 μm–0.2 μm. While the heat treatment is preferable, the present invention can be achieved without the heat treatment.

When a Curie temperature of the high permeability magnetic material film (including an overlying high permeability magnetic material film to be described later) is lower than the heat treatment temperature or a Néel temperature of the antiferromagnetic material film is lower than the heat treatment temperature, the high permeability magnetic material film does not exhibit a single-domain structure after the heat treatment and many spike noises are observed in the recording and reproducing operations.

In order to resolve the above problem, it is necessary to apply a magnetic field in a desired direction (the same direction as that of the magnetic field applied during the formation of the film) during the heat treatment, more exactly in a step of dropping the temperature from the heat treatment temperature, or that the Curie temperature of the high permeability magnetic material film is higher than the heat treatment temperature and the Néel temperature of the antiferromagnetic material film is higher than the heat treatment temperature.

When the amorphous film is formed on the antiferromagnetic material film and the perpendicularly oriented magnetic film is formed on the amorphous film as described above, the thickness of the amorphous film is preferably 20–500 Å if the amorphous film is nonmagnetic material. If the thickness is less than 20 Å, the deposited amorphous film exhibits island pattern, and if the thickness 1s more than 500 Å, the recording efficiency is lowered. The amorphous film of ferromagnetic material will be discussed later.

As the high permeability magnetic material film under the antiferromagnetic material film, wellknown Ni-Fe alloy (so-called permalloy), Fe-Si-Al alloy (so-called sendust) or high permeability amorphous magnetic material may be used although they are not restrictive. The thickness of the high permeability magnetic material film is preferably 0.1–5.0 μm. If the thickness of the high permeability magnetic material film is less than 0.1 μm, the recording efficiency is significantly reduced, and if it is more than 5 μm, the magnetic film may be stripped off because of the reduction of adhesivity between a substrate and the high permeability magnetic material film.

As the substrate material, a non-magnetic material such as glass, high molecule resin or non-magnetic metal is usually used.

The direction of the magnetic field applied during or after the formation of the high permeability magnetic material film and during the formation of the antiferromagnetic material film is preferably in the direction of track width in magnetic recording. An S/N ratio when the direction of the applied magnetic field is in the direction of the track width is 5 dB higher than that when the direction of the applied magnetic field is in the longitudinal direction of bits, and a recording current in the former case is 20% less than that in the latter case. An intensity of the applied magnetic field is no less than 2 Oersteds. If the intensity is less than 2 Oersteds, the effect of the application of the magnetic field is not expected and it is difficult to magnetize the high permeability magnetic material film in the desired direction. There is no upper limit of the intensity although it is limited by a device requirement.

The perpendicular magnetic recording medium having the antiferromagnetic material film formed between the high permeability magnetic material film and the perpendicularly oriented magnetic film is very effective to suppress the creation of spike noise, but it requires a larger recording current and exhibits a lower S/N ratio than a magnetic recording medium having no antiferromagnetic material film because of the presence of the antiferromagnetic material film between the perpendicularly oriented magnetic film and the high permeability magnetic material film.

In order to resolve the above problem and provide a perpendicular magnetic recording medium which does not generate the spike noise, reduces the recording current and exhibits a high S/N ratio, a second high permeability magnetic material film may be formed on the antiferromagnetic material film on the high permeability magnetic material film, and the perpendicularly oriented magnetic film may be formed on the second high permeability magnetic material film. The requirements for the material and the thickness of the second high permeability magnetic material film are similar to those for the high permeability magnetic film under the antiferromagnetic material film. The high permeability magnetic material film on the antiferromagnetic material film and the high permeability magnetic material film under the antiferromagnetic material film may be of the same material or different materials. However, when the conventional Co-Cr alloy, the Co-Cr alloy with a third element added or the Co-Ru alloy is used as the perpendicularly oriented magnetic material film, the high permeability magnetic material film on the antiferromagnetic material film is preferably a preferentially amorphous magnetic alloy. The reason therefor is that the perpendicular orientation of magnetization of the Co-Cr alloy film is closely related to the orientation of the c-axis of the hcp crystal to the normal direction of the film plane and the orientation, to the normal direction of the film plane, of the c-axis of the hcp crystal of the Co-Cr alloy film on the preferentially amorphous metal film is better than the orientation, to the normal direction of the film plane, of the c-axis of the hcp crystal of the Co-Cr alloy film on the crystalline alloy film such as the Ni-Fe alloy film. The material of the high permeability amorphous film formed on the antiferromagnetic material film may be a known amorphous high permeability magnetic alloy.

In order to obtain a perpendicular magnetic recording medium of high performance, it is necessary to apply the magnetic field in the desired direction during the formation of the antiferromagnetic material film as described above. In order to suppress the spike noise and obtain a higher performance perpendicular magnetic recording medium, it is preferable to apply the magnetic field in the desired direction during the formation of the underlying high permeability magnetic material layer, and it is more preferable to apply the magnetic field in the desired direction during the formation of the overlying high permeability magnetic material film. In order to attain a full function of the high permeability magnetic material film, the direction of the application of the magnetic field is preferably the direction of the track width in the recording. The intensity of the magnetic field applied has been described above.

The heat treatment and the application of the magnetic field during the heat treatment are similar to those when the overlying high permeability magnetic film is not provided.

When the preferentially amorphous metal film is used as the high permeability magnetic material film on the antiferromagnetic material film, it is necessary that the crystallization temperature of the high permeability magnetic material film is higher than the heat treatment temperature. If the crystallization temperature is lower than the heat treatment temperature, the preferentially amorphous metal is crystallized during the heat treatment and the permeability is lowered.

Figure 2:
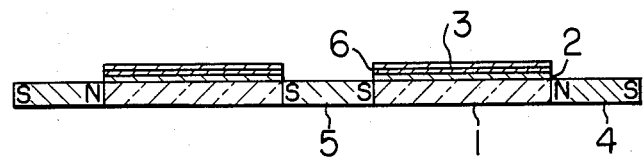
Figure 3A:
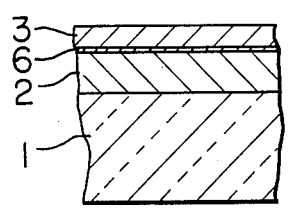
Figure 3B:
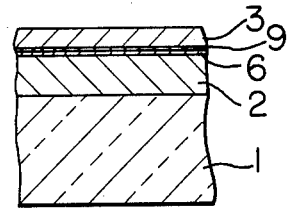
Figure 4:
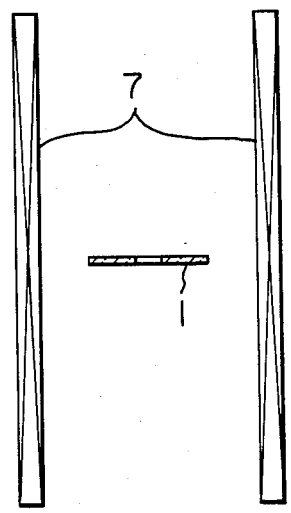
Figure 5:
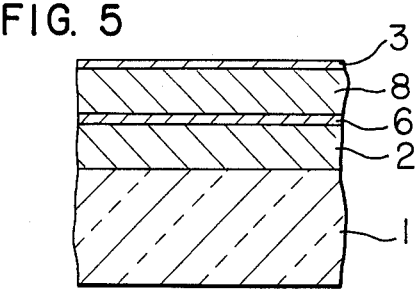
Figure 7A:
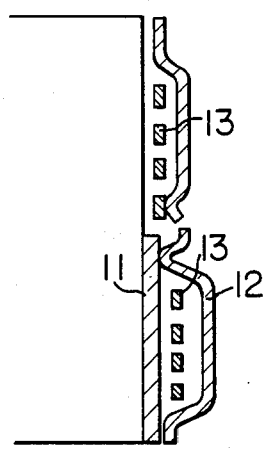
Figure 7B:
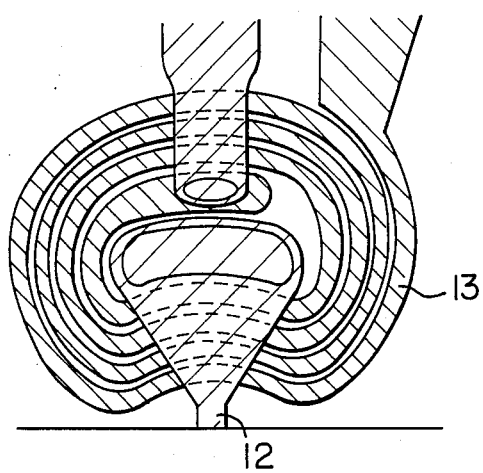

The present invention will be apparent from the following detailed description taken in conjunction with the accompanying drawings, in which:

FIG. 1 is a schematic sectional view for illustrating a manufacturing step of a perpendicular magnetic recording medium as a comparative example, FIG. 2 is a schematic sectional view for illustrating a manufacturing step of a perpendicular magnetic recording medium in one embodiment of the present invention, FIG. 3a is a schematic sectional view for illustrating a structure of the perpendicular magnetic recording medium in one embodiment of the present invention, FIG. 3b is a schematic sectional view of a modification of the perpendicular magnetic recording medium shown in FIG. 3a, FIG. 4 shows a manufacturing step of a perpendicular magnetic recording medium in another embodiment of the present invention, FIG. 5 is a schematic sectional view for illustrating a structure of a perpendicular magnetic recording medium in a further embodiment of the present invention, FIG. 6 is a graph showing a relation between heat treatment temperatures of Co-Cr films of various thicknesses (atmosphere: vacuum, heat treatment time: 2 hours) and perpendicular orientation of magnetization (represented by a variation rate of half width of rocking curve on (0002) plane of hcp crystal), and FIGS. 7a and 7b show sectional and plan views, respectively, of a perpendicular magnetic recording head used in the Examples 5-9.

The present invention is now described in further detail with reference to the embodiments and the comparative example.

COMPARATIVE EXAMPLE

As shown in FIG. 1, a high permeability magnetic material film ($Ni_{80}$-$Fe_{20}$ alloy) 2 was deposited by sputtering to a thickness of 1.0 $\mu$m on a substrate (an annular glass substrate having a thickness of 5 mm, an outer diameter of 10 cm and an inner diameter of 2 cm), and then a perpendicularly oriented magnetic material film ($Co_{80}$-$Cr_{20}$ alloy) 3 was deposited thereon by the same sputtering process to a thickness of 0.5 $\mu$m.

When the $Ni_{80}$-$Fe_{20}$ alloy film was formed, an annular permanent magnet 4 and a disc-shaped permanent magnet 5 were arranged in contact with the annular glass substrate 1 as shown in FIG. 1 so that a radial magnetic field directed to the center of the substrate (or emanated from the center) was always applied during the formation of the alloy film. An intensity of the applied magnetic field was approximately 10 Oersted at a mean radius position of the substrate.

Recording and reproducing operations were carried out with the perpendicular magnetic recording medium thus prepared by using a Mn-Zn ferrite magnetic head having a gap length of 0.3 $\mu$m and the number of turns of 20. Spike noise was observed over the entire track. Since the magnitude of the spike noise was in the same order as a reproduced signal, the noise as well as the signal output were not measurable.

EXAMPLE 1

As shown in FIG. 2, a high permeability magnetic material film ($Ni_{80}$-$Fe_{20}$ alloy) 2 was deposited by sputtering to a thickness of 1.0 $\mu$m on a substrate (an annular glass substrate) 1 similar to that of the comparative example, then an antiferromagnetic material layer ($Fe_{50}$-$Mn_{50}$ alloy film) 6 was deposited thereon by sputtering to a thickness of 0.02 $\mu$m, and then a perpendicularly oriented magnetic material film ($Co_{80}$-$Cr_{20}$ alloy film) 3 was deposited thereon by sputtering to a thickness of 0.5 μm.

When the Ni-Fe alloy film and the Fe-Mn alloy film were formed, the annular permanent magnet 4 and the disc-shaped permanent magnet 5 were arranged in contact with the annular glass substrate 1 in the same manner as in the comparative example so that the radial magnetic field directed to the center of the substrate was always applied during the formation of the alloy films.

Recording and reproducing operations were carried out with the perpendicular magnetic recording medium thus prepared, by using the same ferrite magnetic head as that of the comparative example. The spike noise was not observed at all. A recording current $I_{90}$ which produces 90% of a maximum output at a recording density of 100 kFRPI was 30 mA, and an S/N ratio was 35 dB for the recording density of 100 kFRPI, a recording frequency of 5 MHz and a band width of 10 MHz.

In the present example, the annular and discshaped permanent magnets were removed when the Co-Cr alloy film was formed. When the recording and reproducing operations were carried out with a perpendicular magnetic recording medium prepared by forming the Co-Cr alloy film without removing the permanent magnets and with the magnetic field kept applied, by the same ferrite magnetic head, $I_{90}$ at the recording density of 100 kFRPI was 30 mA and the S/N ratio was 34 dB for the recording density of 100 kFRPI, the recording frequency of 5 MHz and the band width of 10 MHz. FIG. 3a is a schematic sectional view showing a structure of the perpendicular magnetic recording medium prepared by the present example. The numerals are identical to those in FIG. 2.

EXAMPLE 2

The film thickness of the Fe-Mn alloy film in the Example 1 was changed to 20 Å, 30 Å, 500 Å, 1000 Å, 2000 Å and 3000 Å, and the recording and reproducing operations were carried out with the resulting perpendicular magnetic recording media by the same ferrite magnetic head as that of the Example 1. For the perpendicular magnetic recording medium having the 20 Å Fe-Mn alloy film, the spike noise was observed here and there, but for the other media, no spike noise was observed.

$I_{90}$ at the recording density of 100 kFRPI for the perpendicular magnetic recording media having the 30 Å, 500 Å, 1000 Å, 2000 Å and 3000 Å Fe-Mn alloy film were 30 mA, 30 mA, 31 mA, 32 mA and 35 mA, respectively, and the S/N ratios at the recording density of 100 kFRPI, the recording frequency of 5 MHz and the band width of 10 MHz were 36 dB, 35 dB, 34 dB, 33 dB and 30 dB, respectively.

It is seen from the above that when the perpendicular magnetic recording medium having the Fe-Mn alloy film thickness of more than 2000 Å, the recording current is larger and the S/N ratio is lower than the perpendicular magnetic recording medium having the film thickness of less than 2000 Å.

EXAMPLE 3

As shown in FIG. 3b, an amorphous film ($SiO_2$ film having a thickness of 200 Å) 9 was formed by sputtering between the Fe-Mn alloy film and the Co-Cr alloy film of the Example 1, and the recording and reproducing operations were carried out with the resulting perpendicular magnetic recording medium by the same ferrite magnetic head as that of the Example 1. No spike noise was observed. $I_{90}$ at the recording density of 100 kFRPI was 32 mA, and the S/N ratio at the recording density of 100 kFRPI, the recording frequency of 5 MHz and the band width of 10 MHz was 38 dB.

It was confirmed by an X-ray hollow pattern that the $SiO_2$ film of the present example was preferentially amorphous.

By the comparison of the above with the Example 1, it is seen that the recording and reproducing characteristic is further improved by forming the preferentially amorphous film between the antiferromagnetic material film and the perpendicularly oriented magnetic film.

EXAMPLE 4

During the formation of the Ni-Fe alloy film and the Fe-Mn alloy film in the Example 1, a Helmholtz coil 7 was used as shown in FIG. 4 instead of the annular and disc-shaped permanent magnets, and the annular glass substrate 1 was disposed on an axis of the coil so that a magnetic field unidirectionally directed to the substrate was applied.

The recording and reproducing operations were carried out with the resulting perpendicular magnetic recording medium by the Mn-Zn ferrite magnetic head of the Example 1. It was found that the recording current and the S/N ratio varied depending on the position on the recording medium. When the direction of the magnetic field applied during the formation of the Ni-Fe alloy film and the Fe-Mn alloy film was in the direction of the track width, $I_{90}$ at the recording density of 100 kFRPI was 30 mA and the S/N ratio at the recording density of 100 kFRPI, the recording frequency of 5 MHz and the band width of 10 MHz was 35 dB. When the direction of the magnetic field was in the direction of the record bits, $I_{90}$ was 30 mA and the S/N ratio was 30 dB.

It is seen from the above that when the easy axis of magnetization of the high permeability magnetic material film is in the direction of the track width, the recording current is more reduced and the S/N ratio is more increased.

EXAMPLE 5

As shown in a sectional view of FIG. 5, a $Ni_{80}$-$Fe_{20}$ alloy film 2 was deposited by sputtering to a thickness of 1.0 μm on a substrate (annular glass substrate having a thickness of 5 mm, an outer diameter of 10 cm and an inner diameter of 2 cm) 1, then a $Fe_{50}$-$Mn_{50}$ alloy film 6 was deposited thereon by the same sputtering process to a thickness of 0.2 μm, then a $Co_{80}$-$Mo_{9.5}$-$Zr_{10.5}$ alloy film 8 was deposited thereon by sputtering to a thickness of 1.0 μm, and then a $Co_{80}$-$Cr_{20}$ alloy film 3 was deposited thereon to a thickness of 0.2 μm to prepare a perpendicular magnetic recording medium.

During the formation of the $Ni_{80}$-$Fe_{20}$ alloy film, the $Fe_{50}$-$Mn_{50}$ alloy film and the $Co_{80}$-$Mo_{9.5}$-$Zr_{10.5}$ alloy film, the annular permanent magnet and the disc-shaped permanent magnet were arranged in contact to the annular glass substrate in the same manner as the comparative example and the Example 1 so that the radial magnetic field directed to the center (or emanated from the center) was always applied during the formation of the films. An intensity of the applied magnetic field was approximately 10 Oersteds at a mean radius position of the substrate.

The recording operation was carried out with the resulting perpendicular magnetic recording medium by a perpendicular magnetic head as shown in sectional and plan views of FIGS. 7a and 7b and the reproducing operation was carried out by a ferrite head having a gap length of 0.3 μm and the number of turns of 20. No spike noise was observed. The recording current $I_{90}$ which produces 90% of a maximum output at the recording density of 100 kFRPI was 100 mA, and the S/N ratio at the recording density of 100 kFRPI, the recording frequency of 5 MHz and the band width of 10 MHz was 40 dB. In FIGS. 7a and 7b, numerals 11 and 12 denote magnetic poles and numeral 13 denotes a coil.

In the present example, the annular and disc-shaped permanent magnets were removed during the formation of the Co-Cr film. When the recording and reproducing operations were carried out with a recording medium having the Co-Cr film formed without removing the annular and disc-shaped permanent magnets, by the same recording and reproducing heads as those of the present example, $I_{90}$ remained at 100 mA but the S/N ratio at the recording density of 100 kFRPI, the recording frequency of 5 MHz and the band width of 10 MHz was 39 dB.

In the present example, the films were formed in the same vacuum chamber starting from the $Ni_{80}$-$Fe_{20}$ alloy film and ending at the $Co_{80}$-$Cr_{20}$ alloy film, and the sample was not taken out of the vacuum bath during the formation of the films. If it is necessary to take out the sample from the vacuum chamber by an experimental reason or a device requirement, it is desirable to set the sample in the vacuum chamber after the take-out of the sample, fully evacuate the chamber and lightly etch the surface of the sample to clean the surface.

EXAMPLE 6

In the Example 6, during the formation of the $Ni_{80}$-$Fe_{20}$ alloy film, the $Fe_{50}$-$Mn_{50}$ alloy film and the $Co_{80}$-$Mo_{9.5}$-$Zr_{10.5}$ alloy film, they were sputtered while the annular and disc-shaped permanent magnets were attached to the substrate. In the present example, the annular and disc-shaped permanent magnets were attached to the substrate (a) when only the $Fe_{50}$-$Mn_{50}$ alloy film was formed, and (b) when the $Fe_{50}$-$Mn_{50}$ alloy film and the $Ni_{80}$-$Fe_{20}$ alloy film were formed. In the case (a), the spike noise was observed in 1% of area around a track, and in the case (b), the spike noise was observed in 0.1% of the area around the track.

It is seen from the present example and the Example 5 that the application of the magnetic field in the desired direction during the formation of the antiferromagnetic material film and the underlying high permeability magnetic material film is more desirable than the application of the magnetic field during the formation of only the antiferromagnetic material film, and the application of the magnetic field during the formation of all of the lowermost high permeability magnetic material film, the antiferromagnetic material film and the overlying high permeability material film is further more desirable.

EXAMPLE 7

A Helmholtz coil was used instead of the annular and disc-shaped permanent magnets used in the Example 5 during the formation of the $Ni_{80}$-$Fe_{20}$ alloy film, the $Fe_{50}$-$Mn_{50}$ alloy film and the $Co_{80}$-$Mo_{9.5}$-$Zr_{10.5}$ alloy film to apply a undirection magnetic field.

The recording and reproducing operations were carried out with the resulting perpendicular magnetic recording medium by the perpendicular recording head and the MnZn ferrite head used in the Example 5. It was found that the recording current and the S/N ratio varied depending on the position on the recording medium, that is, the direction of the applied magnetic field.

When the direction of the applied magnetic field was in the direction of the track width, $I_{90}$ at the recording density of 100 kFRPI was 100 mA and the S/N ratio at the recording density of 100 kFRPI, the recording frequency of 5 MHz and the band width of 10 MHz was 40 dB, which were identical to those in the Example 5, but when the direction of the applied magnetic field was in the direction of the record bits, $I_{90}$ was 120 mA and the S/N ratio was 35 dB.

When the direction of the applied magnetic field was other than the above two directions, $I_{90}$ at the recording density of 100 kFRPI was 100 mA–120 mA and the S/N ratio at the recording density of 100 kFRPI, the recording frequency of 5 MHz and the band width of 10 MHz was 35–40 dB.

It is thus seen that a highest performance perpendicular magnetic recording medium is obtained when the direction of the applied magnetic field is in the direction of the track width.

EXAMPLE 8

A $Co_{80}$-$Mo_{9.5}$-$Zr_{10.5}$ alloy film was deposited by sputtering to a thickness of 1.0 μm on an annular glass substrate having a thickness of 5 mm, an outer diameter of 10 cm and an inner diameter of 2 cm, then a $Fe_{50}$-$Mn_{50}$ alloy film was deposited thereon by sputtering to a thickness of 0.2 μm, then a $Co_{80}$-$Mo_{9.5}$-$Zr_{10.5}$ alloy film was deposited thereon by sputtering to a thickness of 1.0 μm, and then a $Co_{80}$-$Cr_{20}$ alloy film was deposited thereon to a thickness of 0.2 μm to form a perpendicular magnetic recording medium.

The resulting perpendicular magnetic recording medium was heat treated in vacuum at 500° C. for two hours to prepare a first sample.

The recording operation was carried out with the sample by the perpendicular magnetic head shown in FIG. 7, and the reproducing operation was carried out by a ferrite head having a gap length of 0.3 μm and the number of turns of 20. The spike noise was observed here and there.

Next, the same annular and disc-shaped permanent magnets as those in the Example 5 were attached to the sample during the heat treatment so that the radial magnetic field was applied to the sample during the heat treatment. The recording and reproducing operations were carried out with the resulting sample by the above recording head and the ferrite head. No spike noise was observed and the recording current $I_{90}$ which produces 90% of the maximum output at the recording density of 100 kFRPI was 100 mA and the S/N ratio at the recording density of 100 kFRPI, the recording frequency of 5 MHz and the band width of 10 MHz was 45 dB.

It is seen from the comparison of the present example and the Example 5 that the S/N ratio is significantly improved by the appropriate heat treatment although the recording current does not change.

EXAMPLE 9

Instead of the $Fe_{50}$-$Mn_{50}$ antiferromagnetic material film of the Example 8, a VS film having a Neil temperature of 770° C. was deposited by sputtering to prepare a sample.

The sample was heat treated in vacuum at 500° C. for two hours. Then, the recording operation was carried out with the resulting sample by the perpendicular magnetic head of the Example 5 and the reproducing operation was carried out by the ferrite head of the Example 5. No spike noise was observed and $I_{90}$ at the recording density of 100 kFRPI was 100 mA and the S/N ratio at the recording density of 100 kFRPI, the recording frequency of 5 MHz and the band width of 10 MHz was 45 dB, which were identical to those of the Example 8.

Thus, when the Curie temperature of the high permeability magnetic material film and the Neil temperature of the antiferromagnetic material layer are higher than the heat treatment temperature, it is not necessary to apply the external magnetic field in the desired direction during the heat treatment.

The external magnetic field is applied in the heat treatment process, more exactly, in a step of dropping the temperature after the heat treatment. When the annular and disc-shaped permanent magnets are attached to the sample as in the Example 8, it is necessary to remove the permanent magnets before the heat treatment for convenience in experimental work.

As the antiferromagnetic material having the higher Neil temperature than the heat treatment temperature in the Example 9, compounds such as $PrFeO_3$, $BiFeO_3$ and $Ca_2Fe_2O_5$, in addition to the VS film were effective, and a weak ferromagnetic material such as $\alpha$-$Fe_2O_3$ was also effective.

Instead of the $Fe_{50}$-$Mn_{50}$ alloy in the Examples 5, 6, 7 and 8, compounds such as $CoF_3$ and $FeF_3$ were effective.

While the perpendicular magnetic recording medium were annular in the above Examples, the shape is not restrictive.

As described hereinabove, the perpendicular magnetic recording medium of the present invention produces very small spike noise, requires a low recording current and exhibits a high S/N ratio.

In the above description, detailed explanation are omitted for those matters which are generally known in the art.

Obviously, many modifications and variations of the present invention are possible in the light of the above teachings. It is therefore to be understood that, within the scope of the appended claims, the invention may be practiced otherwise than as specifically described.

We claim:

1. A perpendicular magnetic recording medium comprising a substrate, a high permeability magnetic material film formed on said substrate, an antiferromagnetic material film formed on said high permeability magnetic material film, and a perpendicularly oriented magnetic material film formed over said antiferromagnetic material film.

2. A perpendicular magnetic recording medium according to claim 1 having an amorphous material film formed between said antiferromagnetic material film and said perpendicularly oriented magnetic material film.

3. A perpendicular magnetic recording medium according to claim 1 wherein a thickness of said antiferromagnetic material film is 20–2000 Å.

4. A perpendicular magnetic recording medium according to claim 1 wherein the easy axis of magnetization of said high permeability magnetic material film is in the direction of track width in recording.

5. A perpendicular magnetic recording medium according to claim 1 wherein the material of said antiferromagnetic material film is a Fe-Mn alloy having a Fe content of 45–55 atomic percent.

6. A perpendicular magnetic recording medium according to claim 1 wherein the thickness of said perpendicularly oriented magnetic material film is 0.03–0.5 $\mu$m.

7. A perpendicular magnetic recording medium according to claim 6 wherein the thickness of said perpendicularly oriented magnetic material film is 0.1–0.2 $\mu$m.

8. A perpendicular magnetic recording medium according to claim 1, said perpendicular magnetic recording medium having been subjected to a heat treatment so as to provide a medium having a better perpendicular orientation of magnetization than that of the same medium prior to said heat treatment, wherein the Curie temperature of said high permeability magnetic material film is higher than the temperature of said heat treatment and the Néel temperature of said antiferromagnetic material film is higher than said heat treatment temperature.

9. A perpendicular magnetic recording medium according to claim 1 wherein said antiferromagnetic material film is a film that has been formed in the presence of a magnetic field, the magnetic field having been applied in a predetermined direction.

10. A perpendicular magnetic recording medium according to claim 9 wherein said predetermined direction is the direction of track width in recording.

11. A perpendicular magnetic recording medium according to claim 9 wherein said magnetic field has an intensity of at least 2 Oersteds.

12. A perpendicular magnetic recording medium according to claim 9 wherein said high permeability magnetic material film is a film formed while applying a magnetic field in said predetermined direction.

13. A perpendicular magnetic recording medium according to claim 9 wherein said medium has been subjected to a heat treatment so as to provide a medium having a batter perpendicular orientation of magnetization than that of the same medium prior to said heat treatment, the medium having been subjected to a magnetic field in said predetermined direction during said heat treatment.

14. A perpendicular magnetic recording medium according to claim 1 wherein the antiferromagnetic material film is made of a material selected from the group consisting of $CoF_3$, $FeF_3$, NiO, FeS, VS, $\alpha$-$Fe_2O_3$ and Cr-Mn.

15. A perpendicular magnetic recording medium according to claim 1 wherein the high permeability magnetic material film has a thickness of 0.1–5.0 $\mu$m.

16. A perpendicular magnetic recording medium according to claim 2 wherein said amorphous material film is made of a material selected from the group consisting of $SiO_2$, $Al_2O_3$ and metals.

17. A perpendicular magnetic recording medium according to claim 2 wherein the amorphous material film has a thickness of 20–500 Å.

18. A perpendicular magnetic recording medium according to claim 8 wherein, during said heat treatment, said medium is subjected to a magnetic field in a predetermined direction.

19. A perpendicular magnetic recording medium comprising a substrate, a first high permeability magnetic material film formed on said substrate, an antiferromagnetic material film formed on said first high permeability magnetic material film, a second high permeability magnetic material film formed on said antiferromagnetic material film, and a perpendicularly oriented magnetic material film formed on said second high permeability magnetic material film.

20. A perpendicular magnetic recording medium according to claim 19 wherein said second high permeability magnetic material film on said antiferromagnetic material film is made of an amorphous metal.

21. A perpendicular magnetic recording medium according to claim 19 wherein the thickness of said antiferromagnetic material film is 20–2000 Å.

22. A perpendicular magnetic recording medium according to claim 19 wherein the easy axis of magnetization of said first high permeability magnetic material film on said substrate or of said second high permeability magnetic material film on said substrate and on said antiferromagnetic material film is in a direction of the track width in recording.

23. A perpendicular magnetic recording medium according to claim 19 wherein the material of said antiferromagnetic material film is a Fe-Mn alloy having a Fe content of 45–55 atomic percent.

24. A perpendicular magnetic recording medium according to claim 19 wherein the thickness of said perpendicularly oriented magnetic material film is 0.03–0.5 μm.

25. A perpendicular magnetic recording medium according to claim 24 wherein the thickness of said perpendicularly oriented magnetic material film is 0.1–0.2 μm.

26. A perpendicular magnetic recording medium according to claim 19, said perpendicular magnetic recording medium having been subjected to a heat treatment so as to provide a medium having a better perpendicular orientation of magnetization than that of the same medium prior to said heat treatment, wherein the Curie temperature of the first and second high permeability magnetic material films are higher than the temperature of said heat treatment and the Néel temperature of said antiferromagnetic material layer is higher than said heat treatment temperature.

27. A perpendicular magnetic recording medium according to claim 26 wherein, during said heat treatment, said medium is subjected to a magnetic field in a predetermined direction.

28. A perpendicular magnetic recording medium according to claim 19 wherein said antiferromagnetic material film is a film that has been formed in the presence of a magnetic field, the magnetic field having been applied in a predetermined direction.

29. A perpendicular magnetic recording medium according to claim 28 wherein said predetermined direction is the direction of track width in recording.

30. A perpendicular magnetic recording medium according to claim 28 wherein said magnetic field has an intensity of at least 2 Oersteds.

31. A perpendicular magnetic recording medium according to claim 28 wherein said first high permeability magnetic material film is a film formed while applying a magnetic field in said predetermined direction.

32. A perpendicular magnetic recording medium according to claim 31 wherein said second high permeability magnetic material film is a film formed while applying a magnetic field in said predetermined direction.

33. A perpendicular magnetic recording medium according to claim 28 wherein said medium has been subjected to a heat treament so as to provide a medium having a better perpendicular orientation of magnetization than that of the same medium prior to said heat treatment, the medium having been subjected to a magnetic field in said predetermined direction during said heat treatment.

* * * * *